April 9, 1963  G. A. WEISGERBER ETAL  3,085,026
IMPREGNATED CORRUGATED PAPERBOARD AND PROCESS OF MAKING SAME
Filed Sept. 28, 1960

FIG. I

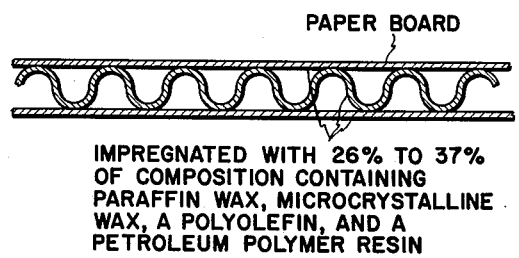

PAPER BOARD

IMPREGNATED WITH 26% TO 37% OF COMPOSITION CONTAINING PARAFFIN WAX, MICROCRYSTALLINE WAX, A POLYOLEFIN, AND A PETROLEUM POLYMER RESIN

FIG. II

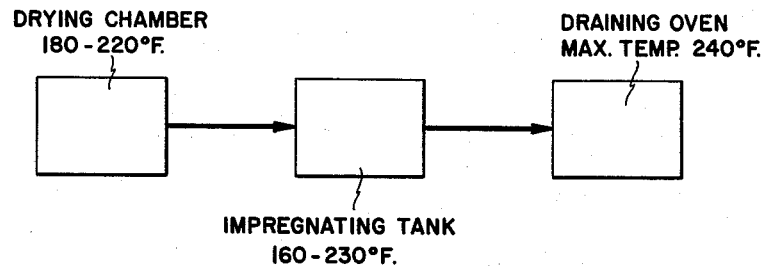

DRYING CHAMBER
180-220°F.

IMPREGNATING TANK
160-230°F.

DRAINING OVEN
MAX. TEMP. 240°F.

GEORGE A. WEISGERBER
HERMAN L. THWAITES   INVENTORS
HARRY M. FARNHAM, JR.

BY W. O. Heilman

PATENT ATTORNEY

United States Patent Office 3,085,026
Patented Apr. 9, 1963

3,085,026
IMPREGNATED CORRUGATED PAPERBOARD
AND PROCESS OF MAKING SAME
George A. Weisgerber, Cranford, and Herman L.
Thwaites and Harry M. Farnham, Jr., Clark, N.J., assignors to Esso Research and Engineering Company, a corporation of Delaware
Filed Sept. 28, 1960, Ser. No. 58,896
6 Claims. (Cl. 117—60)

This invention relates to petroleum wax products. More particularly, the invention relates to novel petroleum wax products which are especially suitable for coating corrugated cartons and sheets, and to a process for coating such cartons to produce a stronger and more durable product than hitherto obtainable.

It is the principal purpose and object of the present invention to provide improved wax compositions particularly adapted to beneficiate corrugated cardboard cartons and sheeting. It is a still further object of the present invention to provide corrugated cardboard containers and boards having a remarkably high wet strength and anti-rupture properties. It is a still further object of the present invention to set forth a novel process whereby corrugated coardboard sheetings having the above-mentioned properties can be prepared.

It has now been found that these objects and advantages can be achieved by impregnating the paperboard with a four component wax composition containing (1) crystalline paraffin waxes melting in the range of from about 120° to 160° F., (2) a microcrystalline wax melting in the range of from about 160° to 180° F., (3) a polyethylene having an average molecular weight of about 1,500 to 25,000, preferably 5,000 to 12,000, and (4) a resin having a molecular weight of about 800 to 2,000, preferably 1,000 to 1,200, and described in more detail below.

FIGURE I depicts in fragmentary form an article conforming to the present invention. FIGURE II illustrates schematically the improved process of impregnating paperboard. The paperboard is predried at a temperature of from about 180 to 220° F. in a drying chamber. The predried paperboard is then placed in an impregnating tank containing the wax composition of the instant invention. The impregnated paperboard is then placed in a draining oven in order to remove any excess wax.

Paraffin waxes and wax compositions containing a host of additives have been employed for a variety of uses, such as waterproofing textiles and papers, preparing insulating coatings, coatings for milk cartons and the like. It is common experience that each particular end use dictates the desirable characteristics of the coating, and thus additives and compositions eminently suitable for one purpose are often not suitable for another. Thus a large variety of wax compositions have been described that are especially suitable for some specific uses but not for others.

A new use for wax that has recently been developed is the impregnation of corrugated paperboard containers. Particularly when these containers are used in connection with storing and transporting of foods, it has been found that a gradual reduction in strength occurs, even after impregnation with wax compositions that in other applications normally afford good waterproofing protection. This loss of strength is due to the severe conditions of long and continued exposure to moisture or water. Thus, these cartons are often used in shipping either icepacked or "hydrocooled" foods. The term "hydrocooled" refers to chilling both the carton and contents in 30° F. brine. Under these severe conditions, corrugated cartons impregnated with wax, or with many wax compositions normally imparting strength to fibrous materials failed to afford sufficient protection.

In moisture proofing of non-corrugated paper, cartons, or wrappings, the purpose generally is to prevent or minimize the water vapor transmission through the paper wall of the package. The problem may be to package dry materials to keep them dry, or to package moist materials to keep them moist. This packaging problem calls for a good continuous surface film (no pin holes or voids) which has adequate flexibility and toughness to withstand the handling and so forth to which the wrapping or package is subjected. Also of considerable importance is the requirement that the continuous surface coating must meet certain requirements of appearance, gloss, scuff resistance, etc.

With this packaging problem it is observed that the rate of moisture transmission is a function of the type of coating and thickness of the surface film. For unbroken films, paraffin waxes have the lowest water vapor transmission rates. But the paraffins are usually blended with other waxes or additives to achieve the required flexibility, gloss, hardness, etc.

For liquid containers such as milk cartons or drinking cups, the requirements are essentially the same, that is, there must be an impervious continuous surface film on the side in contact with the liquid. With milk cartons, the protection against water pickup and softening of the paper or board obtained with equivalent amounts of coating material are greater for a surface coating than for an absorbed coating. That is, surface protection is more desirable than impregnation.

With corrugated cartons the problem is different from the standpoints of package design, the service for which it is intended, the quality requirements, and the method of wax application.

(1) Corrguated board is multi-walled. The simplest form uses three walls—the two outside walls called liners and the inner corrugated component called the medium.

(2) Corrguated boxes are primarily used as shipping containers not for the packaging of relatively low weight individual items, and consequently have much greater strength requirements.

(3) In the applications referred to, the box or board is subjected to water on all sides including the open spacings between the medium and liners.

(4) The board or boxes are or may be scored, bent, cut, and so forth after the wax is applied. As a result, a surface coating only would be disrupted or broken and water allowed to penetrate to the fiber. Fiber saturation (with wax or special compositions) is required to protect properly the board or box from too great a loss in strength due to water absorption.

Thus, waxing of corrugated cartons calls for full impregnation deep into the fibers of the separate construction pieces. Surface films are less effective and are contraindicated, being wasteful of wax and being prone to introduce problems of maintaining uniform appearance of such surface coating. The requirement of impregnation is in direct contrast to other waxed package problems. In the milk carton coating, for example, waxes are intentionally blended with certain additives for the express purpose of reducing penetration into the paperboard and maximizing the surface layer.

TEST PROCEDURES

The following tests are commonly used in the paperboard industry.

TEST SIGNIFICANCE (1) *Flat crush.*—This test primarily measures the resistance of the fluted or corrugated medium to loads or pressures applied to the sides of the board. A collapsed corrugated medium lowers the resistance of the board to stresses applied in other directions.

(2) *Column compression or crush.*—The laboratory short column test measures the resistance of the board to loads or presures applied edgewise to the board. This test simulates compression tests made on fullscale corrugated board cartons. The tests may be run with the fluting in a vertical or horizontal position. Cartons are usually fabricated with the flutes in a vertical position in the side walls of the carton (from top to bottom).

Stresses of this type are obtained when loaded cartons are stacked in plies.

(3) *Mullen bursting strength.*—This test measures the force required to rupture the board completely. It is related to tensile strength. The Mullen test is used to designate grades and strengths of boards and is included in government and container shipping specifications.

All of these tests are considered to be significant, each measures the resistance of the board to loads or pressures, applied in various directions and to various degrees. For some uses or applications different emphasis may be placed on specific tests.

Dry board tests are not included because these show little or no difference between type of coating and vary mainly with the type of board and amount of wax used. Table I gives examples of the insensitivity of dry board tests to types of coating on the board.

*Table I.—Typical Dry and Wet Strengths of Wax Coated and Uncoated Corrugated Papeboard*

["A" flute—126 lb./1000 ft.$^2$ basis wt.]

| Coating | Wax pick-up | | Dry strength (conditioned at 73° F., 50% RH[1]) | | | Wet strength (immersed 2 hrs. in 73° F. water) | | |
|---|---|---|---|---|---|---|---|---|
| | Lbs./M s.f. | Percent | Flat crush | Column crush | Mullen [2] | Flat crush | Column crush | Mullen [2] |
| None | 0 | 0 | 25 | 47 | 296 | 1.9 | 4.5 | 76 |
| W-6497 [3] | 62 | 49 | 32 | 73 | 225 | 7.2 | 10.4 | 172 |
| 133/135 ref. paraffin | 61 | 48 | 32 | 70 | 225 | 4.8 | 7.8 | 108 |

[1] RH is relative humidity.
[2] Dry Mullen strengths decrease with wax loading up to about 50% wax pick-up, then increase. Wet Mullen strengths increase with wax loading.
[3] Blend No. 1 in Table III and in examples.

The illustrations are confined to one type of board to avoid confusion. Data show that the relative differences between coatings are the same when applied to different types and weight boards.

The wax coating weights in most instances have been corrected to a constant 60 lbs. wax/1000 ft.$^2$ so that all coatings are on a comparative basis. Strengths are affected by wide differences in coating weight.

The wet strength measurements are used since they relate directly to properties required in board applications. The wet strengths are directly related to the moisture or water picked up by the board. The differences in wet strength between the various coatings reflect the degree to which the coatings protect or prevent excessive moisture or water pick-up.

TEST PROCEDURE AND EQUIPMENT

Dip Coating

EQUIPMENT

Two sizes of steel (asbestos insulated) tanks have been used for dip coating, (1) a tank having six compartments 10" x 7" x 1" and (2) a tank having two compartments 14" x 14" x 1 3/16" each. The small tank is heated on a hot plate or in a controlled temperature oven, the large tank is wound with electric heating tape.

A controlled temperature oven for draining samples at specified temperatures.

PROCEDURE

The standardized conditions to condition boards for directly comparable tests with different coatings are as follows:

The boards to be coated are conditioned at 73° F. and 50% relative humidity for at least 24 hours. The size of board samples dipped depends on the tank used, 6" x 6½" or 12" x 12½". The odd dimension, 6½" or 12½", is in the lengthwise direction of the flutes. The samples are dipped with the flutes upright (a wire hook through the top center is used to hold the sample). The samples are totally immersed and agitated slightly in order to assist the removal of air bubbles from the board surfaces.

Dipping is continued for 30 seconds, the sample is then raised, drained over the tank for a few seconds, then hung in an oven controlled to the desired temperature and allowed to drain (with flutes vertical) for the specified time. It is then removed from the oven and hung to cool at room temperature. When cooled the bottom one-half inch drip end is trimmed off; excess wax accumulates at this end during the drain period.

The samples are then weighed, the difference between the coated and uncoated board of equivalent dimensions being the wax pick-up.

The procedure most generally used is to dip at 210° F. for 30 seconds and drain at 210° F. for 20 minutes. Slightly higher consumption may be obtained by a shorter drain of around 5 minutes. Drain periods of longer than 20 minutes have no significant effect on consumption.

The wax pick-up obtained when impregnating kraft paper or corrugated kraft paperboard cartons, followed by a drain period in a soaking oven to remove excess wax, automatically falls within a limited range of about 40% to 55% wax pick-up $$\left(\frac{\text{Wt. of wax}}{\text{Basis wt. of uncoated board}} \times 100\right)$$

or 26% to 37% on the basis of the weight of the coated board.

When impregnating with subsequent soaking and draining to remove excess wax, the wax pick-up is not reduced below approximately 40% pick-up, even when high temperatures or prolonged drain periods are used. This wax is firmly bonded to the paper fiber. If less than an amount equivalent to 40% wax pick-up is applied by other means used for metering the wax, i.e., roll-coating, etc., the wax is not dispersed to obtain a uniform fiber coating; even by subsequent heating, i.e. applying about 20% to one side of a kraft liner, subsequent heating does not disperse the wax through the paper to give a "strike through" to the other side.

Wax pick-ups apparently in excess of 55% may be obtained by more rapid cooling, or very short drain periods at elevated temperatures. However, the wax in excess of 55% pick-up mainly represents surface wax or wax that is frozen on the surfaces of the board.

On the average, draining impregnated board samples at 210° F. gives about 55% for 30 seconds, 52% for 1 minute, 48% for 5 minutes, 45% for 15 minutes and 42% for 20 minutes. Extending the time for hours does not lower the pick-up below about 40%.

In the data presented hereinafter the wax pick-up is adjusted to a common basis of 60 lbs. wax per thousand square feet, a loading equivalent to 47.5% wax pick-up. The individual values on which these data are based range from 40% to 55% (average 47.5%) wax pick-up.

The adjustment of these data to a common wax pick-up of 47.5% (60 lbs./M s.f.) was made using curves established from a large volume of data showing the effect of wax loading on wet strengths.

STRENGTH TESTS

EQUIPMENT (1) A sample specimen cutter such that specimens of accurate dimensions may be obtained, having clean sharp edges, without exerting pressure on the boards before testing.

(2) Hinde and Dauch crush tester, model TMI–17–18, 4″ x 4″ square plattens, loading rate 2″ per minute.

(3) Column compression attachment TMI–17–19–2 for use with the Hinde and Dauch crush tester.

(4) Perkins Mullen tester, motor driven model A, TMI–13–1–1.

(5) Water bath for soaking samples.

TEST PROCEDURES

Tests are made on sample specimens after conditioning by two methods: (1) dry, conditioned at 73° F. and 50% relative humidity for at least 24 hours; (2) wet, immediately (no longer than 5 to 10 minutes) after soaking in 73° F. water for 2 hours. The two hour soaking test is now used in preference to a one hour test in order to minimize test variations.

(1) Flat crush test (Hinde and Dauch crush tester): The tests are conducted on 10 sq. in. specimens, either circular specimens (TMI-circular cutter 17–9–3) or 2½″ x 4″ specimens. Tests should be made on a minimum of three, preferably five or six samples and the results averaged. Report as p.s.i. (pounds per square inch).

(2) Column compression (Hinde and Dauch crush tester with column compression attachment): The tests are conducted on specimens 2½″ in height (flutes vertical) x 4″ in length. When mounted in the attachment this leaves 1″ height unsupported. Tests should be made on a minimum of three, preferably five or six specimens and averaged. Results reported as pounds per inch of length.

Comparable results have been obtained using the short column compression test described in Packaging Engineering, September 1959, P–92, by K. L. Killicut, Forest Products Laboratory, Wisconsin. No attachment is used for holding the sample specimens which are 1″ in height. The tests requires that the sample be cut with clean right angle edges and that they maintain a true vertical position during the test.

MULLEN TEST

Sample size is not critical, tests may be run on individual specimens or a number of tests made on a strip with proper spacing allowed between test locations. A minimum of six tests, preferably ten to twelve, should be made and the results averaged. Results are reported as p.s.i. (pounds per square inch).

The major components of the compositions of the present invention comprise normal paraffin and isoparaffin hydrocarbons derived from petroleum crude oils and having melting points within the usual range from about 120° to about 180° F., preferably between about 130° and 155° F. The paraffin waxes preferably predominate in normal paraffins and ordinarily are a mixture of homologous paraffins. These waxes are obtained by well-known dewaxing procedures from waxy lubricating oils, such as by solvent dewaxing with a methyl ethyl ketone-toluene mixture, methyl isobutyl ketone, propane, and the like. The precipitated wax crystals are removed by centrifuging or filtering to form a slack wax, and then are preferably further purified by recrystallization or washing to form scale wax and refined wax. Preferably refined waxes contain less than 0.5% by weight of contaminating oil. They are the refined crystalline paraffin waxes, well known in the art and in commerce.

In the present invention these waxes are ordinarily present in amounts of at least 60% by weight of the essential four component composition, and preferably in amounts greater than 75% by weight thereof. Their properties are shown in items No. 1, 2, 3 and 4 in Table I–A.

The microcrystalline waxes employed in the present compositions have higher molecular weights than crystalline paraffin waxes and have melting points of at least 160° F. and preferably higher than about 165° F. They may be obtained also by conventional procedures from either heavy lubricating oil distillates or from residual wax-bearing fractions. Microcrystalline waxes are well known in the art of wax coating compositions and as an article of commerce. Typical properties are shown in item No. 5 in Table I–A.

*Table I–A.—Typical Wax Inspections*

| Number | Refined paraffin waxes | | | | Microcrystalline wax |
|---|---|---|---|---|---|
| | 1 | 2 | 3 | 4 | |
| Melting point grade | 125/128 | 130/132 | 133/135 | 150/155 | 165/170 |
| Melting point, °F., ASTM–D–938 | 128 | 131 | 134 | 151 | 169 |
| Oil content, weight percent, ASTM–D–455 | 0.2 | 0.2 | 0.2 | 0.2 | 0.8 |
| Color: | | | | | |
| ASTM–D–156 | +30 | +30 | +30 | +26 | -------- |
| ASTM–D–1500 | -------- | -------- | -------- | -------- | 1.9 |
| Viscosity at 210° F., cs., ASTM–D–445 | 3.8 | 3.8 | 3.8 | 5.7 | 20.6 |
| Refractive index at 212° F | 1.4213 | 1.4215 | 1.4218 | 1.4282 | 1.4447 |
| Distillation ASTM–D–1160 press., mm | 10 | 10 | 10 | 10 | 1 |
| 5% off, °F | 458 | 454 | 440 | 540 | 565 |
| 10% off, °F | 466 | 466 | 452 | 546 | 598 |
| 50% off, °F | 502 | 500 | 507 | 563 | 672 |
| 90% off, °F | 506 | 562 | 567 | 588 | -------- |
| 95% off, °F | 584 | 586 | 586 | 602 | -------- |

The microwaxes are present in amounts less than about 30% by weight of the compositions of the present invention and usually between about 5 to 15% by weight.

The third ingredient of the present compositions is a polyolefin, and in particular a polyethylene having an approximate average molecular weight between about 1,500 and 25,000, preferably about 12,000, and melting between about 215° and 225° F. The polyethylene or other polyolefin, such as polypropylene, or their copolymers, is usually present in amounts of less than about 8% by weight of the four-component composition, and preferably is present to the extent of 1 to 4%. Properties of two grades of polyethylene are given in Table II.

The fourth essential component of the present composition is a polymer resin, preferably a petroleum resin. These resins are to be distinguished from the olefin polymers and copolymers enumerated above. Properties of three polymer resins are given in Table II.

Table II

| Number | 1 | 2 | 3 | 4 | 5 |
|---|---|---|---|---|---|
| Name | "DYLT" | "Epolene-N" | "Piccopale 100" resin | "Piccolastic A-75" polymer | "Piccolyte S-70" polymer |
| Type | Linear ethylene polymer | Linear ethylene polymer | Polymerized pet. monomers methylated paraffin chains | Styrene polymer | Terpene polymerpinenes, mainly beta pinene |
| Softening point ball and ring (ASTM E-28-51T) | 104° C | 106° C | 100±3° C | 75±3°C | 70±3°C. |
| Molecular weight, approximate | 12,000 | 2,500 | 1,100 | | |
| Specific gravity, approximate | 0.93 | 0.925 | .970–975 | | .99. |
| Density | | | | 1.06 | |
| Refractive index | | 1.516 | 1.5116 | 1.59 | |
| Acid number | | | <1 | <1 | <4. |
| Saponification number | | | <2 | <1 | <4. |
| Bromine number | | | 7.3 | | |
| Iodine value | | | (Wijs) 120 | <10 | |
| Viscosity, approximate at | 190° C., 5×10² p | 250° F., 2,500 cp | | | 180° C., 20.7 p. |
| Flash point | | >600 | 500° F | | |
| Fire point | | >600 | 500° F | | |

NOTE.—The polyethylenes are higher molecular weight and essentially saturated. The "Piccopale 100" has the most unsaturation.

Hydrocarbon resins to which the present invention is applicable are made by treating a hydrocarbon mixture containing diolefins, olefins, aromatics, paraffins, and naphthenes with 0.25 to 1.75% of an aluminum halide catalyst such as aluminum chloride and aluminum bromide. The catalysts may be used as solids or they may be employed as slurries in inert diluents or as hydrocarbon complexes such as are prepared by reacting aluminum chloride with raffinates stripped from resin polymerizates, for example, a naphtha containing about 60% olefins and 40% aromatics.

The polymeriaztion feed should preferably be one from which the cyclodienes have been substantially removed. Typical hydrocarbon fractions useful for feeds in making these resins boil from 20° to 170° C. Analyses show the following composition:

| | Fraction, °C. | Weight percent |
|---|---|---|
| Distillation | 20– 70 | 0–60 |
| | 70–130 | 65–40 |
| | 130–170 | 35– 0 |
| Diolefins | | 8–20 |
| Aromatics | | 19–49 |
| Olefins | | 60–30 |
| Paraffins and naphthenes | | 5– 1 |

The polymerization reactions are conducted at temperatures in the range of −30° to +75° C. (preferably −10° to +60° C.). Residual catalyst is quenched by suitable methods, such as addition of methyl alcohol and subsequent filtration, or by addition of dilute acid, water and/or caustic washing. The final solution is then stripped of unreacted hydrocarbons and low molecular weight oils by vacuum or steam distillation. The product is a substantially non-aromatic unsaturated hydrocarbon resin. A hydrocarbon mixture suitable for resin production is conveniently found in hydrocarbon streams obtained by steam cracking gas oils, heavy naphthas, or residua from petroleum. These cracked streams have wide boiling ranges between 20° and 170° C., or may be composed of any intermediate fraction selected from this range. The petroleum distillate resins synthesized by this method usually have softening points above 90° C.

The resin prepared in accordance with this process has a softening point of about 207° to 218° F., a molecular weight in the range of 1,000 to 1,200, and an iodine number (Wijs) of 100 to 140, preferably below 120. About 1 to 25% by weight of the resin is incorporated into the final wax composition, preferably 5 to 10%.

The coatings or impregnations of the board are made with hot melt or molten wax, preferably at a temperature of 160° to 230° F. It is important not to go as high as 240° F. This applies to both the wax temperature and subsequent draining temperature. High temperatures tend to weaken the fiber and also to darken the board.

The impregnation may be carried out in a number of ways, such as by dipping the flat carton followed by a suitable drain period at selected time and temperature conditions. Alternately, the wax may be applied to one or more of the board components before combining to form the board, by dipping, roll coating, spraying, etc., with subsequent heating to disperse the wax uniformly.

An important discovery has been made, in association with the impregnation of corrugated paperboards, that improved crush strength and wet strength are obtained if the moisture content of the corrugated board is reduced to a low level before the waxing operation. The normal content of paperboard is 4 to 10% moisture, depending upon the humidity prevailing in the storage. Drying the board at moderate temperatures in the range of about 180° to 220° F. removes much of this water, and reduces it to the desired upper limit of not more than 2%. It is important in the drying operation that the corrugated paper be not heated in excess of about 238° F. If such excessive temperatures are used for drying, the natural strength of the paper fibers is greatly reduced.

The reduction of the moisture content of the paperboard prior to wax coating or impregnation results in a waxed carton having a wet strength, even with the lower wax consumption, of equal or higher magnitude.

The improved compositions and techniques of the present invention may be best understood in conjunction with the illustrative examples and data below:

*Example 1*

(1) Blends containing paraffin wax, microwax, 12,000 molecular weight polyethylene and resin are better (having higher wet strengths) than blends without resin (same base waxes).

| Additives from Table II in wax blends of Table III | Wet strength | | |
|---|---|---|---|
| | Flat | Column | Mullen |
| (1) 2% DYLT, 10% piccopale | 7.8 | 12.5 | 205 |
| vs. | | | |
| (5) 2% DYLT | 4.9 | 10.7 | 160 |
| (2) 2% DYLT, 10% piccopale | 7.3 | 10.2 | 187 |
| vs. | | | |
| (8) 2% DYLT | 5.3 | 11.3 | 181 |

(2) Blends containing paraffin wax, microwax, 12,000 molecular weight polyethylene and resin are better than with resin alone.

| Additives from Table II in wax blends of Table III | Wet strength | | |
|---|---|---|---|
| | Flat | Column | Mullen |
| (1) 2% DYLT, 10% piccopale | 7.8 | 12.5 | ¹ 205 |
| vs. | | | |
| (9) 20% piccopale | 7.5 | 12.0 | 200 |
| and | | | |
| (10) 20% piccopale | 6.8 | 9.7 | (²) |

¹ 177, 2 hours.   ² 160, 2 hours.

In the same base stock (refined paraffin) the 2% polyethylene plus 10% resin is only slightly better than the 20% resin with no polyethylene. Blend 10, however, is definitely inferior to blend 1.

(3) Using a wide range of M.P. waxes (including microwax) is better than using paraffin wax alone.

| Additives from Table II in wax blends of Table III | Wet strength | | |
|---|---|---|---|
| | Flat | Column | Mullen |
| (1) 8% microwax | 7.8 | 12.5 | 205 |
| vs. | | | |
| (3) No microwax | 7.0 | 12.5 | 152 |

(4) Using a much larger proportion of microwax in the blend gives only a little better result.

| Additives from Table II in wax blends of Table III | Wet strength | | |
|---|---|---|---|
| | Flat | Column | Mullen |
| (5) 8% microwax, 2% DYLT | 4.9 | 10.7 | 160 |
| vs. | | | |
| (4) 20% microwax, 2% DYLT | 6 | 10 | 157 |

It will be seen from the above data that corrugated paperboard coatings made on the same board under the same conditions and at the same consumption level with blends of paraffin wax, microwax, polyethylene and the petroleum resin have better wet strengths after water treatment than blends containing only polyethylene or only resin. It will also be observed that substantially further improvements in water resistance are obtained by using a base wax of wide melting point range, i.e. paraffin wax plus microwax, rather than paraffin wax alone.

*Example 2*

Though not quite as effective as the mixed petroleum resin, a styrene polymer (column 4, Table II) may be used:

| | Wet strength | | |
|---|---|---|---|
| | Flat | Column | Mullen |
| (1) 2% DYLT, 10% piccopale | 7.8 | 12.5 | 205 |
| vs. | | | |
| (11) 2% DYLT, 10% styrene polymer | 7.7 | 11.4 | 178 |

Also better than 2% DYLT alone:

| | Wet strength | | |
|---|---|---|---|
| | Flat | Column | Mullen |
| (5) 2% DYLT | 4.9 | 10.7 | 160 |

Or higher concentrations of DYLT alone:

| | Wet strength | | |
|---|---|---|---|
| | Flat | Column | Mullen |
| (6) 4% DYLT | 4.4 | | 113 |

Or resin alone:

| | Wet strength | | |
|---|---|---|---|
| | Flat | Column | Mullen |
| (10) 20% piccopale | 6.8 | 9.7 | |

*Example 3*

A terpene polymer resin (column 5, Table II) is much less effective than the petroleum resin (column 3, Table II) in the four-component coating composition of this invention:

| | Wet strength | | |
|---|---|---|---|
| | Flat | Column | Mullen |
| (1) 2% DYLT, 10% piccopale | 7.8 | 12.5 | 205 |
| (12) 2% DYLT, 10% terpene resin | 6.4 | 10 | 160 |
| (5) 2% DYLT | 4.9 | 10.7 | 160 |
| (10) 20% piccopale | 6.8 | 9.7 | |

Table III

[Coatings on "A" flute, 126 lb./M ft.² basis weight, 60 lb. wax/M ft.² board dipped 210° F., 30 sec.; drained 210° F., 15-20 min.]

| Blend No. | Paraffin waxes 130/132 | Paraffin waxes 133/135 | Paraffin waxes 150 | Micro-wax | Poly-ethyl-ene. 12,000 M.W. (DYLT) | Resins Picco-pale 100 | Resins Styrene Picco-lastic A-75 | Resins Terpene Picco-lyte S-70 | Cong. pt., °F. | Visc. 210° F., cs. | Flat crush, p.s.i. | Col. comp., #/in. | Mullen, p.s.i. |
|---|---|---|---|---|---|---|---|---|---|---|---|---|---|
| 1 | 68 | | 12 | 8 | 2 | 10 | | | 147 | 9.25 | 7.8 | 12.5 | 205 |
| 2 | | 68 | 12 | 8 | 2 | 10 | | | | | 7.3 | 10.2 | 187 |
| 3 | 77 | | 11 | | 2 | 10 | | | 136.8 | 7.99 | 7.0 | 12.5 | 152 |
| 4 | 66 | | 12 | 20 | 2 | | | | 138 | 7.24 | 6 | 10 | 157 |
| 5 | 78 | | 12 | 8 | 2 | | | | 153 | 11.4 | 4.9 | 10.7 | 160 |
| 6 | 76 | | 12 | 8 | 4 | | | | 145.8 | 8.58 | 4.4 | | 113 |
| 7 | 90 | | 2.8 | 4.2 | 3 | | | | 147 | 7.45 | 4.2 | 10.7 | 154 |
| 8 | | 78 | 12 | 8 | 2 | | | | 133 | 7.3 | 5.3 | 11.3 | 181 |
| 9 | 60 | | 12 | 8 | | 20 | | | | | 7.5 | 12 | 200 |
| 10 | ¹60 | | 12 | 8 | | 20 | | | | | 6.8 | 9.7 | |
| 11 | 68 | | 12 | 8 | 2 | | 10 | | 147.5 | 8.07 | 7.7 | 11.4 | 178 |
| 12 | 68 | | 12 | 8 | 2 | | | 10 | 148.5 | 9.61 | 6.4 | 10 | 160 |
| 13 | 78 | | 12 | 8 | ²2 | | | | | | 5.5 | 10 | 178 |

¹ Contains 1.5N oil.  ² Epolene-N.

It has previously been pointed out that wax consumption can be reduced and wet strength enhanced by using a paperboard predried to a moisture content of less than about 2% by weight. The effect of using reduced moisture content is shown in Tables IV and V, illustrated with several different waxing conditions and several paraffin waxes. Moisture content in these examples was measured by means of the Hart moisture meter and was also checked by weight differences.

Table IV.—Drying the Paperboard Decreases Consumption and Improves Strength Factor Conditions:
  Dipping conditions: Coupon of corrugated board dipped into molten wax at 180° F. or 240° F. for one minute, removed and allowed to harden at room temperature, 73° F.
  Flat crush strength, wet: Test conducted on Hinde & Dauch crush test machine, with corrugated paper coupon flat, measuring crush strength of corrugations. Data shown are strength of wet board, soaked one hour at 73° F.

EXPERIMENTS AT DIPPING TEMPERATURE 240° F.

| Wax used | ASTM M.P., °C. | Percent H₂O in the board | Wax consumption, lbs. wax/1,000 sq. ft. corrugated board | Wet flat crush strength, p.s.i. |
|---|---|---|---|---|
| Paraffin wax | 130 | 0 | 56 | 6.0 |
| | 130 | 6 | 75 | 5.1 |
| Do | 150 | 0 | 72 | 3.8 |
| | 150 | 6 | 79 | 3.5 |

EXPERIMENTS AT DIPPING TEMPERATURE 180° F.

| Paraffin wax | 130 | 0 | 57 | 6.0 |
|---|---|---|---|---|
| | 130 | 6 | 68 | 4.0 |

Table V.—Additional Data on Board Drying Effect

[Coatings on "A" flute, 126 lb./M ft.² basis wt., 60 lb. wax/M ft.² board dipped 210° F., 30 sec.; drained 210° F., 15 min.]

| Wax | Percent H₂O in board | Flat crush Wax, lbs./M ft.² | Flat crush P.s.i. | Column compression Wax, lbs./M ft.² | Column compression #/in. | Mullen Burst Wax, lbs./M ft.² | Mullen Burst P.s.i. |
|---|---|---|---|---|---|---|---|
| (1) | 0 | 64 | 10.8 | 62 | 15.5 | 60 | 288 |
| | 2.5 | 66 | 9.3 | 65 | 13.4 | 68 | 208 |
| | 4.5 | 66 | 8.3 | 62 | 12.8 | 63 | 211 |
| (2) | 0 | 64 | 7.5 | 61 | 10.2 | 62 | 176 |
| | 2.5 | 63 | 6.8 | 65 | 9.8 | 67 | 159 |
| | 4.5 | 62 | 5.9 | 63 | 9.8 | 58 | 149 |

NOTE.—Wax (1): 130/132 refined 60%; 150 refined 12%; microwax 8%; piccopale resin 20%. Wax (2): 130/132 refined 76%; 150 refined 12%; microwax 8%; 4500 M.W. polyethylene 4%.

What is claimed is:

1. An improved article of manufacture comprising a corrugated paperboard essentially uniformly impregnated with a composition comprising a blend of at least 60% by weight of a refined crystalline paraffin wax containing no more than 0.5% by weight of oil and melting between about 120° to 180° F., a microcrystalline wax melting above 160° F. in an amount up to 30% by weight, a polyolefin having an average molecular weight in the range of 1,500 to 20,000 in an amount up to 8% by weight and from 1 to 15% by weight of a solid polymer resin having a softening point of at least 158° F., said resin being selected from the group consisting of petroleum polymer resins and styrene polymer resins; said composition constituting from 26 to 37% of the total weight of the impregnated paperboard.

2. An improved article of manufacture comprising a corrugated paperboard essentially uniformly impregnated with a composition containing at least 60% by weight of a refined crystalline paraffin wax containing no more than 0.5% by weight of oil and melting in the range of about 130° to 155° F., 5 to 10% by weight of a microcrystalline wax having a melting point of at least 165° F., 1 to 4% of a polyethylene having an average molecular weight in the range of about 1,500 to 25,000 and 5 to 10% by weight of a solid polymer resin having a softening point of at least 158° F. and a molecular weight between 800 and 2,000, said resin being selected from the group consisting of petroleum polymer resins and styrene polymer resins; said composition constituting from 26 to 37% of the total weight of the impregnated paperboard.

3. An improved article of manufacture comprising a corrugated paperboard essentially uniformly impregnated with a composition containing at least 75% by weight of a refined substantially oil-free paraffin wax melting in the range of 130° to 155° F., 5 to 10% by weight of a microcrystalline wax melting above 165° F., 1 to 4% of a polyethylene having an average molecular weight of about 12,000 and 5 to 10% by weight of a petroleum polymer resin having a softening point of about 212±6° F. and having a molecular weight of about 1,000 to 1,200; said composition constituting from 26 to 37% of the total weight of the impregnated paperboard.

4. An improved process for impregnating corrugated paperboard which comprises immersing said board in a composition comprising a blend of at least 60% by weight of a refined crystalline paraffin wax containing no more than 0.5% by weight of oil and melting between about 120° to 180° F., up to 30% by weight of a microcrystalline wax melting above 160° F., up to 8% by weight of a polyolefin having an average molecular weight in the range of 1,500 to 20,000 and from 1 to 15% by weight of a solid polymer resin having a softening point of at least 158° F., said resin being selected from the group consisting of petroleum polymer resins and styrene polymer resins, maintaining an impregnation temperature in the range of 160° to 230° F., withdrawing impregnated paperboard from said composition, draining said board at a temperature no higher than 240° F., and recovering a paperboard of increased strength.

5. An improved process for impregnating corrugated paperboard which comprises drying said board to a moisture content of not more than 2%, impregnating said board at a temperature of 160° to 230° F. with a wax composition comprising at least 75% by weight of a refined substantially oil-free paraffin wax melting in the range of 130° to 155° F., 5 to 10% by weight of a microcrystalline wax melting above 165° F., 1 to 4% of a polyethylene having an average molecular weight of about 12,000 and 5 to 10% by weight of a petroleum polymer resin having a softening point of about 212±6° F. and having a molecular weight of about 1,000 to 1,200.

6. The process of claim 5 wherein said board is dried prior to said impregnation at a temperature of 180° to 220° F.

References Cited in the file of this patent

UNITED STATES PATENTS

| | | |
|---|---|---|
| 2,733,225 | Smith | Jan. 31, 1956 |
| 2,758,100 | Bailly et al. | Aug. 7, 1956 |
| 2,967,116 | Hollinger et al. | Jan. 3, 1961 |
| 2,967,781 | Jakaitis | Jan. 10, 1961 |